United States Patent Office 3,401,165
Patented Sept. 10, 1968

3,401,165
HYDRAZONES OF 1-AMINO-4-(6,11-DIHYDRODI-
BENZ[b,e]OXEPIN-11-YL)PIPERAZINES
Peter Yonan, Chicago, Ill., assignor to G. D. Searle & Co.,
Chicago, Ill., a corporation of Delaware
No Drawing. Filed Aug. 13, 1965, Ser. No. 479,650
7 Claims. (Cl. 260—240)

ABSTRACT OF THE DISCLOSURE

Hydrazones obtained by the reaction of aromatic and heterocyclic aldehydes with 1-amino-4-(6,11-dihydrodibenz[b,e]oxepin-11-yl)piperazine and related compounds are described herein. These compounds are useful as anti-convulsants.

---

The present invention relates to a group of compounds which are hydrazones of 1-amino-4-(6,11-dihydrodibenz[b,e]oxepin-11-yl)piperazines and related compounds. More specifically, it relates to compounds having the following general formula

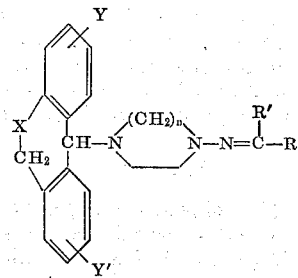

wherein X is selected from the group consisting of O and S; Y and Y' are each selected from the group consisting of hydrogen and halogen; $n$ is a whole number between 2 and 3 inclusive; R is selected from the group consisting of lower alkyl, phenyl, substituted phenyl, pyridyl, or substituted pyridyl; and R' is selected from the group consisting of hydrogen and lower alkyl. R and R' may be further combined to represent, with the connecting carbon atom, cycloalkylidene or N-(lower alkyl)piperidylidene.

The halogens referred to above as values for Y and Y' can be fluorine, chlorine, bromine, and iodine although chlorine is preferred. The lower alkyl radicals referred to above contain up to 6 carbon atoms and can be represented by methyl, ethyl, propyl, butyl, and the like. The cycloalkylidene radicals referred to above contain from 5 to 8 carbon atoms.

R can more particularly represent phenyl, tolyl, halophenyl, hydroxyphenyl, methoxyphenyl, methylenedioxyphenyl, cyanophenyl, pyridyl, methylpyridyl, 1-oxidopyridyl, and 1-oxidomethylpyridyl. The halophenyl radicals referred to above include fluorophenyl, chlorophenyl, bromophenyl, and iodophenyl.

A particularly preferred embodiment of this invention are those compounds wherein R' is hydrogen and R is pyridyl, methylpyridyl or N-oxides of these pyridyl radicals.

The compounds of this invention are useful because of their anti-convulsant properties. In particular, they antagonize electroshock seizures; they have also been found to be inhibitors of pentylenetetrazole-induced convulsions. The present compounds also inhibit the germination of seeds of Trifolium.

The organic bases of this invention form nontoxic acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are conveniently prepared by the reaction of an aldehyde or ketone with a hydrazine of the following general structure

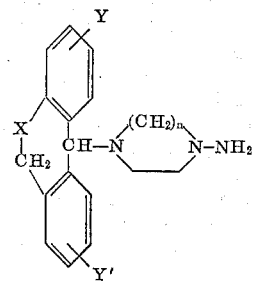

wherein X, Y, Y', and $n$ are defined as above. The reaction is conveniently carried out in an inert solvent. That is, the reaction is carried out in a solvent which will not react with the aldehydes, ketones, or hydrazines used. Useful solvents for this reaction are alcohols such as ethanol and 2-propanol and aromatic hydrocarbons such as benzene and toluene. The reaction can optionally be carried out in the presence of a small amount of acid which serves to promote the reaction. Acetic acid is an example of an acid useful for this purpose.

Although aldehydes and ketones are the most convenient starting materials for use in this reaction, carbonyl derivatives are also useful. For example, it is possible to use acetals, ketals, diacetates, and other carbonyl derivatives which can be readily converted to carbonyl compounds in the reaction mixture. Nitrones, which can be converted to carbonyl compounds in the reaction mixture, are also useful. Particularly useful in this regard are compounds such as N-(4-dimethylaminophenyl)-α-(N-oxidopyridyl)nitrones.

In addition to their usefulness as intermediates for the compounds of the present invention, the hydrazines described in the formula above also possess activity as pepsin inhibitors and anti-protozoal and anti-algal agents.

The following examples are presented to further illustrate the present invention; they should not be construed as limiting it in spirit or in scope. In these examples, quantities are indicated by parts by weight and temperatures are indicated in degrees centigrade (° C.).

Example 1

A solution of 23 parts of 11-hydroxy-6,11-dihydrodibenz[b,e]oxepine is dissolved in 300 parts of chloroform and, with stirring, a stream of anhydrous hydrogen chloride gas is passed through the solution for 30 minutes. The solution becomes cloudy and warm during this process. The mixture is then dried and the solvent is evaporated. The residue is dissolved in hexane and cooled to give a crystalline product. This is recrystallized from hexane to give 11-chloro-6,11-dihydrodibenz[b,e]-oxepine melting at about 80–82°C.

In a similar manner, 11-hydroxy-6,11-dihydro-dibenzo[b,e]thiepine and 2-chloro-11-hydroxy-6,11-dihydrodibenz[b,e]oxepine are each reacted with hydrogen chloride gas to give, respectively, 11-choloro-6,11-dihydrodibenzo[b,e]thiepine and 2,11-dichloro-6,11-dihydrodibenz[b,e]oxepine.

Example 2

A mixture of 20 parts of 11-chloro-6,11-dihydrodibenz[b,e]oxepine, 11 parts of 1-nitrosopiperazine and 30 parts of potassium carbonate in 320 parts of 2-butanone is stirred at room temperature for 12 hours and then refluxed for 5.5 hours. The hot mixture is filtered to remove inorganic salts and the solvent is evaporated from the filtrate. The residual solid is mixed with ether and filtered and then recrystallized from a mixture of chloroform and ether to give 1-nitroso-4-(6,11-dihydrodibenz-[b,e]oxepin-11-yl)piperazine melting at about 190–191°C.

In a similar manner, 11-chloro-6,11-dihydrodibenzo-[b,e]thiepine and 2,11-dichloro-6,11-dihydrodibenz [b,e]-oxepine each react with 1-nitrosopiperazine to give, respectively, 1 - nitroso - 4 - (6,11 - dihydrodibenzo[b,e]-thiepin-11-yl)piperazine and 1-nitroso-4-(2-chloro-6,11-dihydrodibenz[b,e]oxepin-11-yl)piperazine.

Likewise, the reaction of 11-chloro-6,11-dihydrodibenz [b,e]oxepin with 1-nitrosohomopiperazine according to the procedure described above gives 1-nitroso-4-(6,11-dihydrodibenz[b,e]oxepin-11-yl)homopiperazine. The intermediate 1-nitrosohomopiperazine is prepared in the following manner. To a solution of 200 parts of homopiperazine in 100 parts of water is added 450 parts of concentrated hydrochloric acid over a period of 30 minutes while the temperature is maintained at about 40–45°C. The solution is then cooled to 0°C. and a solution of 141 parts of sodium nitrite in 280 parts of water is added portionwise while the temperature is maintained at 0–5°C. The mixture is stirred for an additional 15 minutes after the addition is complete, and then cooled in an ice bath and a solution of 1000 parts of 50% aqueous sodium hydroxide solution is added portionwise while the temperature is maintained below 25°C. The oily layer which forms is separated and the aqueous layer is extracted with chloroform. The oily layer and the chloroform extracts are then combined, dried, and distilled to give 1-nitroso-homopiperazine boiling at about 110–115°C. at 0.2 mm. pressure.

Example 3

A solution of 15 parts of 1-nitroso-4-(6,11-dihydrodibenz[b,e]oxepin-11-yl)piperazine in 90 parts of hot tetrahydrofuran is added portionwise to a stirred suspension of 5 parts of lithium aluminum hydride in 270 parts of tetrahydrofuran; the temperature is maintained at 35–40°C. during the addition. With the completion of the addition, the mixture is heated at this temperature for an additional 30 minutes. It is then cooled to about 5°C. and decomposed by the cautious addition of water, aqueous sodium hydroxide, and then water. The mixture is then filtered to remove the inorganic salts which are washed with hot tetrahydrofuran. The solvent is then evaporated from the filtrate to leave a residual solid. This is mixed with pentane and then filtered to give 1-amino-4-(6-,11 - dihydrodibenz[b,e]oxepin - 11 - yl)piperazine melting at about 146–147°C.

If the above procedure is repeated using the appropriate niroso compounds as the starting materials, the following hydrazines are obtained:

1 - amino-4-(6,11-dihydrodibenzo[b,e]thiepin-11 - yl) piperazine.

1-amino-4-(2-chloro - 6,11 - dihydrodibenz[b,e]oxepin-11-yl)piperazine.

1 - amino - 4 - (6,11 - dihydrodibenz[b,e]oxepin-11-yl) homopiperazine.

Example 4

A solution of 4 parts of 1-amino-4-(6,11-dihydrodibenz [b,e]oxepin-11-yl)piperazine, 2.5 parts of pyridine-2-carboxaldehyde, and 1 drop of acetic acid in 30 parts of 2-propanol is heated on a steam bath for about 10 minutes. The solid which forms is separated and recrystallized from a mixture of chloroform and hexane to give 1-(6,11 - dihydrodibenz[b,e]oxepin - 11-yl-4-(2 - pyridyl methyleneamino)piperazine melting at about 222–224° C.

In a similar manner, 2.5 parts of pyridine-4-carboxaldehyde is reacted with 4 parts of 1-amino-4-(6,11-dihydrodibenz[b,e]oxepin-11-yl)piperazine to give 1-(6,11-dihydrodibenz[b,e]oxepin-11 - yl) - 4 - (4-pyridylmethyleneamino)piperazine melting at about 205–206°C. after recrystallization from a mixture of chloroform and hexane. This compound has the following formula

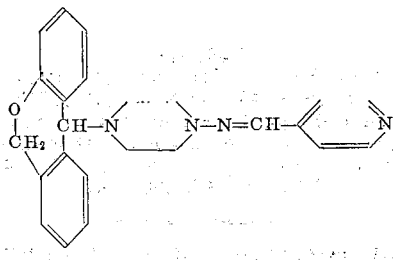

Example 5

The reaction of pyridine-4-carboxaldehyde with the appropriate hydrazine according to the procedure described in Example 4 gives the following compounds:

1-(6,11-dihydrodibenzo[b,e]thiepin - 11 - yl) - 4 - (4-pyridylmethyleneamino)piperazine.

1-(2-chloro-6,11-dihydrodibenz[b,e]oxepin-11-yl) - 4-(4-pyridylmethyleneamino)piperazine.

1-(6,11-dihydrodibenz[b,e]oxepin-11-yl) - 4 - (4-pyridylmethyleneamino)homopiperazine.

Example 6

6-methylpyridine-2-carboxaldehyde is reacted with 1-amino-4-(6,11-dihydrodibenz[b,e]oxepin-11-yl) - piperazine according to the procedure described in Example 4 to give 1-(6,11-dihydrodibenz[b,e]oxepin-11-yl)-4 - (6-methyl-2-pyridylmethyleneamino)piperazine melting at about 153–154° C.

Example 7

5 parts of N-(4-dimethylaminophenyl)-α-(1-oxido-4-pyridyl)nitrone is slurried with 25 parts of water and then acidified with 25 parts of 3 N hydrochloric acid. An additional 10 parts of water is added to the mixture. Then, a solution of 5.7 parts of 1-amino-4-(6,11-dihydrodibenz [b,e]oxepin-11-yl)piperazine in 15 parts of 3 N hydrochloric acid is added to the mixture. A precipitate forms. This is separated by filtration and washed with cold water. The solid is then slurried in water and benzene and the mixture is made neutral with dilute potassium carbonate solution. The benzene layer is then separated, washed with water, and dried; the solution is concentrated to a small volume at reduced pressure. Ether is added to the resultant concentrate which is then cooled to give crystals of 1-(6,11-dihydrodibenz[b,e]oxepin-11-yl)-4-[(1-oxido-4-pyridyl) methyleneamino] piperazine.

Example 8

Benzaldehyde, 4-hydroxybenzaldehyde, piperonal, and 4-cyanobenzaldehyde are each reacted with 1-amino-4-(6,11-dihydrodibenz[b,e]oxepin-11-yl)piperazine according to the procedure described in Example 4. The respective products obtained are:

1-(6,11-dihydrodibenz[b,e]oxepin-11-yl) - 4 - benzylideneaminopiperazine.

1-(6,11-dihydrodibenz[b,e]oxepin-11-yl)-4 - (4-hydroxybenzylideneamino)piperazine melting at about 199–200° C.

1-(6,11-dihydrodibenz[b,e]oxepin-11-yl)-4 - piperonylideneaminopiperazine melting at about 171–172° C.

1-(6,11-dihydrodibenz[b,e]oxepin-11-yl)-4 - (4-cyanobenzylideneamino)piperazine.

Example 9

1-methyl-4-piperidone is reacted with 1-amino-4-(6,11-dihydrodibenz[b,e]oxepin-11-yl)piperazine according to the procedure described in Example 4 to give 1-(6,11-dihydrodibenz[b,e]oxepin-11-yl)-4 - (1-methyl-4-piperidylideneamino) piperazine melting at about 203–204° C.

What is claimed is:
1. A compound of the formula

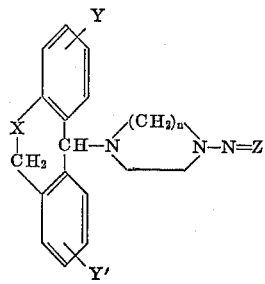

wherein X is selected from the group consisting of O and S; Y and Y' are each selected from the group consisting of hydrogen and chlorine; n is a whole number between 2 and 3 inclusive; and Z is selected from the group consisting of 1-methyl-4-piperidylidene and =CH—R wherein R is selected from the group consisting of phenyl, methylenedioxyphenyl, hydroxyphenyl, cyanophenyl, pyridyl, methylpyridyl, and the N-oxides of the preceding heterocyclic groups.

2. A compound of the formula

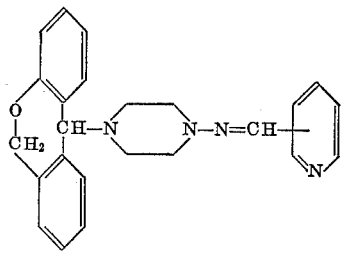

3. 1-(6,11-dihydrodibenz[b,e]oxepin-11-yl)-4-(2 - pyridylmethyleneamino) piperazine.
4. 1-(6,11-dihydrodibenz[b,e]oxepin-11-yl) - 4-(4-pyridylmethyleneamino)piperazine.
5. 1-(6,11-dihydrodibenzo[b,e]thiepin-11-yl)-4 - (4-pyridylmethyleneamino)piperazine.
6. 1-(6,11-dihydrodibenz[b,e]oxepin-11-yl) - 4 - (6-methyl-2-pyridylmethyleneamino)piperazine.
7. 1-(6,11-dihydrodibenz[b,e]oxepin-11-yl) - 4 - piperonylidineaminopiperazine.

References Cited

UNITED STATES PATENTS 3,290,300   12/1966   Cusic et al. _____ 260—240

OTHER REFERENCES

Winthrop et al., J. Med. Pharm. Chem., vol. 5, pp. 1207 to 1215 (1962).

JOHN D. RANDOLPH, *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,401,165 September 10, 1968

Peter Yonan

It is certified that error appears in the above identified patent and that said Letters Patent are hereby corrected as shown below:

Column 3, line 53, "niroso" should read -- nitroso --. Col 4, lines 4 to 14, the right-hand portion of the formula should appear as shown below:

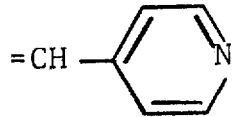

Signed and sealed this 3rd day of February 1970.

(SEAL)
Attest:

Edward M. Fletcher, Jr.

Attesting Officer

WILLIAM E. SCHUYLER, JR.

Commissioner of Patents